Oct. 13, 1964 R. J. ORWIN ETAL 3,153,194
COMMON OSCILLATOR TRANSCEIVER WITH INDEPENDENT
RECEIVER TONE CONTROL MEANS
Filed July 13, 1962

Inventors.
Robert J. Orwin.
James D. Uhler.
By Hofgren, Brady, Wegner,
Allen & Stellman.
Attorneys.

United States Patent Office 3,153,194
Patented Oct. 13, 1964

3,153,194
COMMON OSCILLATOR TRANSCEIVER WITH INDEPENDENT RECEIVER TONE CONTROL MEANS

Robert J. Orwin, La Grange Park, and James D. Uhler, Cicero, Ill., assignors to The Hallicrafters Co., a corporation of Delaware Filed July 13, 1962, Ser. No. 209,561
5 Claims. (Cl. 325—20)

This invention is concerned with a radio transmitting and receiving apparatus or transceiver, in which the transmission and reception are carried on at substantially the same frequency and under the control of the same oscillator.

In transceivers using a common oscillator circuitry for the transmission and reception channels, situations can arise where one or both operators will make frequency adjustments from time to time, particularly to alter the pitch of the received signal. In prior transceivers having slaved operation, this change of oscillator frequency on reception results in a corresponding transmission frequency change. The operator of another transceiver in the system is then likely to make a corresponding change in his frequency setting. As a result, the frequency being used shifts across a band of frequencies, causing unnecessary interference with other units operating in the same frequency band.

A principal object of this invention is to provide a novel transceiver unit which has a common oscillator with independent tuning control during one mode of operation, as in reception, to permit slight adjustment of the reception frequency without affecting the transmission frequency.

One feature of the invention is the provision in a transceiver of selectively operable transmission and reception channels each including a frequency establishing means for the respective channel and responsive to a control oscillator, a control oscillator operably connected with both of the frequency establishing means and having controllable tuning means for varying the frequency of operation of both channels, switch means for alternately rendering operative one or the other of the channels, and controllable auxiliary tuning means connected with the control oscillator through the switch means and adjustable to modify the frequency of operation of one of the channels independently of the frequency of operation of the other.

Another feature is that each of the channels includes a mixer or heterodyne stage, responsive to the control oscillator, for determining the frequency of operation of the respective channel.

A further feature is that the circuit includes a further switch connected between the switch means and the auxiliary tuning element and operable to connect in the circuit of the oscillator either the same or different reactive elements in the receive position of the switch means as in the transmit position.

Further features and advantages will readily be apparent from the following description and from the drawings, in which.

The problems with prior transceiver systems are particularly acute in the case of single sideband and CW or carrier wave operation. Consider first the situation of a single sideband system with two identical transceivers. One set transmits a carrier signal with a modulating signal. The operator of the other set tunes his transceiver to substantially the carrier frequency. However, the pitch or tone of the detected, received signal may be varied by varying the receiver tuning. Accordingly, the operator of the other set may adjust his tuning until the voice of the transmitting operator sounds normal or natural. As the controllable tuning oscillator used during reception is used also to establish the transmission frequency for the transceiver, any error on the part of the second operator will result in a corresponding error in transmitted frequency when the second set is used for transmission. The operator of the first transceiver may similarly adjust his reception frequency for a natural pitch, and the variation in frequency is likely to be compounded. In some cases the two stations are retuned after each transmission. Furthermore, the operator of the transceiver unit receiving a signal often finds it desirable to mistune in order to reduce the effect of interference from other stations. This can cause an even greater discrepancy between sending and receiving frequencies of the two units than results from the desire for a natural pitch.

With transceivers operating on CW code transmission, mistuning or detuning may cause a greater frequency variation than with a modulated single sideband signal. With CW operation, adjustment of the transceiver control oscillator controls the pitch of the detected signal, and may be set over a wide range without loss of intelligence.

The problem is more acute where the system is made up of three or more stations. Here, even if some of the additional stations have separately tunable transmitters and receivers, they must still follow the changes introduced by the transceiver tuning.

A further complication is found with single sideband equipment in the VHF frequency range. For example, the Federal Communications Commission regulations require a channel frequency accuracy which permits errors of only up to 750 cycles per second, at 150 megacycles. Where one of the units is at one edge of the tolerance range and the other at the other edge, there is a maximum permissible difference of 1500 cycles per second. However, it has been found that for satisfactory single sideband operation the sending and receiving stations must be maintained within 150 cycles of each other. While it is possible to design oscillator circuits which will achieve this accuracy, it is impractical from the standpoint of production and maintenance costs. Thus a rather substantial variation in frequency of operation may be required.

Figure 1:
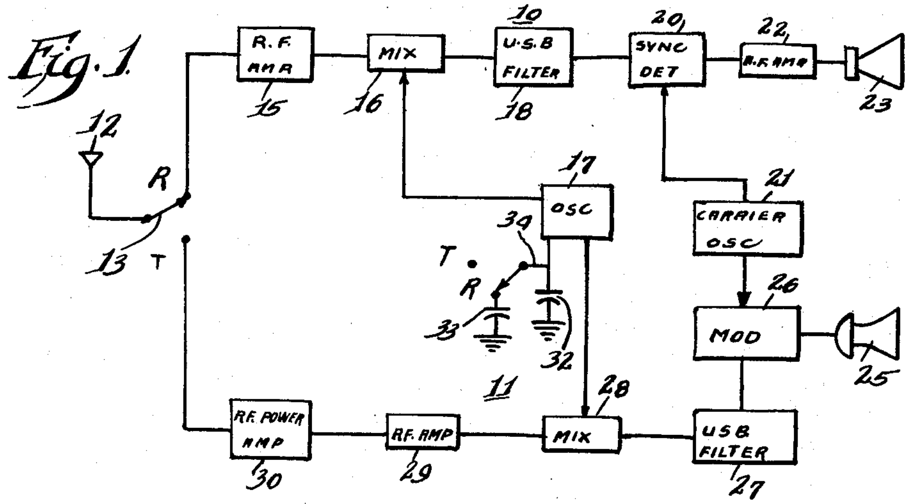
FIGURE 1 is a simplified block diagram of a transceiver embodying the invention.

Turning now to the drawings, and particularly to FIGURE 1, an embodiment of the invention will be described. The transceiver of FIGURE 1 has a receiving channel 10 and transmitting channel 11. An antenna 12 is selectively connectible with each of the channels through a switch 13 which is part of a switch means for selecting between transmitting and receiving operation. The receiving channel 10 includes a radio frequency amplifier 15 connected through switch 13 with antenna 12. The output of the radio frequency amplifier is connected with heterodyne mixer stage 16 which also has connected therewith a control signal from control oscillator 17 establishing the frequency of operation of the receiving channel. A filter 18 in the output of mixer 16 selects the desired modulation product from the mixer, and in the example illustrated in FIGURE 1, selects only the upper sideband of the desired output. The selected signal is connected with a synchronous detector 20 which receives a demodulating signal from carrier oscillator 21. The output of the synchronous detector is connected through an audio amplifier 22 with a speaker 23. It will be understood that the simplified functional block diagram of FIGURE 1 omits many stages which would be incorporated in an operative system, as intermediate frequency amplifiers and the like. The transmit and receive switching may be such that the same circuitry serves as the upper sideband filters 18 and 27 in the reception and transmission channels, respectively. Furthermore, in some transceivers, a double frequency conversion is used in both channels. The specific design of these portions of the system does not affect the concept of the invention.

In the "transmit" position of the control switch means, the output of microphone 25 is connected with a modulator 26 in which the voice signals are modulated on the output of carrier oscillator 21. The upper sideband of the modulation product is selected by filter 27 and coupled to a heterodyne mixer stage 28. The output of control oscillator 17 is also connected with mixer 28 establishing the frequency of the signal to be transmitted. The output of mixer 28 is connected through radio frequency amplifier 29, power amplifier 30 and switch 13 with antenna 12.

Oscillator 17, which is common to both channels, provides a control signal to mixers 16 and 28 which, together with the mixer circuitry, determines the frequency of operation of the channels. Oscillator 17 is provided with a tuning element, as capacitor 32, which is effective to vary the frequency of operation of both channels and may be utilized in adjusting transceiver operation to the proper frequency. In accordance with the invention, auxiliary tuning means, here a second capacitor 33, is connected with capacitor 32 through switch 34, which is another section of the switch means controlling the mode of operation of the transceiver. Capacitor 33 is connected in the circuit and rendered operative in the "receive" position of switch section 34, and is adjustable to vary the reception frequency of the receiving channel of the transceiver through a limited range sufficient to control the tone or pitch of the audio signal derived during reception.

As a specific example, with a transmitted signal of 6 megacycles oscillator 17 might operate at a frequency of the order of 4.5 megacycles and have a tuning range of 500 kilocycles, through manipulation of main tuning capacitor 32. In the receive position, capacitor 33 might provide a further tuning range of 5 to 10 kilocycles. This is ample to permit the operator to achieve an audio pitch which he feels proper. The carrier oscillator would provide a signal at 1.5 megacycles to the demodulator.

During transmission, capacitor 33 is out of the circuit and the transmission frequency is determined by the setting of capacitor 32.

It is preferable that the tunable oscillator be outside the transmitting selectivity loop of the transceiver. That is, the range of frequencies of the tunable oscillator should not fall within the range of frequencies handled by either channel during transmission or reception. If the variable frequency oscillator did have a frequency within the frequency operating range of the system, it might give rise to spurious responses. In the embodiment of the invention discussed above, the frequency of oscillator 17 is well outside the range of frequencies transmitted through either the receiving or transmitting channels.

Figure 2:
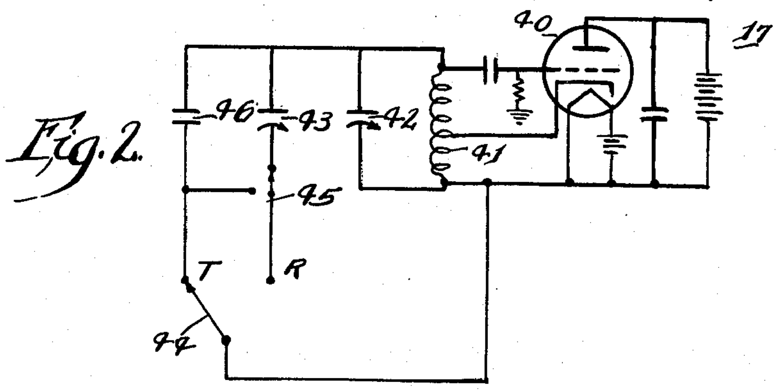
FIGURE 2 is a schematic diagram of an oscillator circuit illustrating the invention.

In FIGURE 2, a typical variable frequency oscillator circuit designed for use with this invention, is illustrated. The oscillator includes a triode 40 connected with a tuned circuit including inductor 41 and main tuning capacitor 42. An auxiliary tuning capacitor 43 is connected with the tuned circuit through "transmit-receive" switch 44. As pointed out above, the auxiliary tuning element, capacitor 43, should have a value such that it provides a tuning range of the order of 5,000 to 10,000 cycles. A further switch 45 is connected in the circuit between switch 44 and capacitor 43. In a first position of the switch 45, auxiliary tuning capacitor 43 is connected in the circuit with switch 44 in the receive position. Switch 45 has a second position in which capacitor 46 is connected with the tuned circuit of the oscillator in both positions of switch 44. This has several advantages. If slave operation is desired, switch 45 may be left in its second position, connecting capacitor 46 in the circuit in both "transmit" and "receive" conditions. With the capacitor 46 in the circuit during transmission only, capacitor 43 can be adjusted to vary the oscillator frequency during reception above and below the frequency during transmission. This permits a full range of control of the reception frequency through manipulation of capacitor 43 alone, without readjustment of main tuning capacitor 42.

Figure 3:
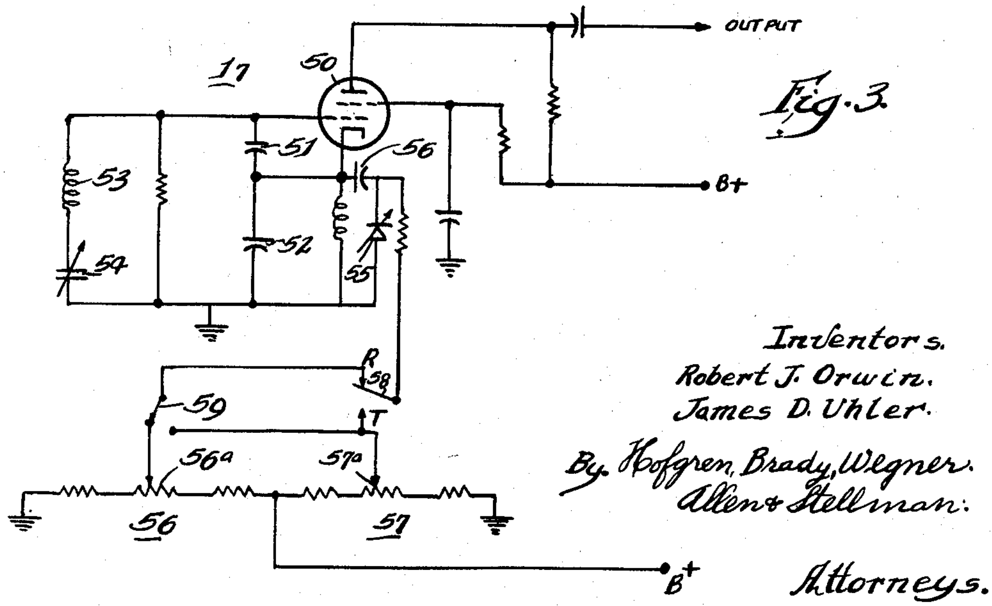
FIGURE 3 is a schematic diagram of an oscillator circuit illustrating another embodiment of the invention.

A further embodiment of the oscillator circuit is illustrated in FIGURE 3. Tetrode 50 utilizes the screen grid element as the anode of the oscillator section so that changes in loading on the output circuit have relatively little effect on the frequency of oscillation. The tuned circuit includes a pair of capacitors 51 and 52 connected in parallel with the main tuning inductor 53 which has a variable capacitor 54 connected in series therewith and providing the main tuning control. A voltage sensitive variable capacitor 55 which is connected through coupling capacitor 56 across capacitor 52 of the tuned circuit provides the auxiliary tuning element and a slaving capacitor, as 46 of FIGURE 2, and further permits the incorporation of a simple calibration adjustment. Bias potentials for variable capacitor 55 are derived from voltage dividers 56 and 57 connected acros the B supply of the transceiver. Voltage divider 56 includes a potentiometer *56a* while voltage divider 57 includes a corresponding potentiometer *57a*. In the "receive" position of switch 58, which is part of the main "transmit-receive" switch means for the transceiver, capacitor 55 is connected with the movable tap of potentiometer *56a* through switch 59. Potentiometer *56a* provides the fine receiver tuning control in accordance with the invention. In the "transmit" position of switch 58, potentiometer *57a* provides bias for capacitor 55 and may be utilized to calibrate main tuning control 54. Switch 59 may be operated to connect capacitor 55 with potentiometer *57a* in the "receive" position, if slave operation is desired.

While we have shown and described certain embodiments of our invention, it is to be understood that it is capable of many modifications. Changes, therefore, in the construction and arrangement may be made without departing from the spirit and scope of the invention as disclosed in the appended claims.

We claim:

1. In a transceiver, transmitting and receiving means of the character described, comprising: selectively operable transmission and reception channels each including frequency establishing means for the respective channel, responsive to a control oscillator; a control oscillator operably connected with said frequency establishing means, said control oscillator having a tuned circuit with an adjustable reactive element therein for controlling the frequency of the oscillator and of the transmission and reception channels; switch means having "transmit" and "receive" positions for alternately rendering one or the other of said transmission and reception channels operative; and controllable auxiliary tuning means including a first reactive element and an adjustable second reactive element, one element being connected with the tuned circuit of said control oscillator through a second of said switch means in each position thereof, said second element being adjustable to modify the frequency of operation of the reception channel independently of the frequency of operation of the transmission channel.

2. The transceiver of claim 1 wherein a further switch is connected between said switch means section and said auxiliary tuning reactor and operable to connect in the tuned circuit of the oscillator either the same or different reactive elements in the "receive" position of the switch means as in the "transmit" position.

3. In a transceiver, transmitting and receiving means of the character described, comprising: selectively operable transmission and reception channels each including frequency establishing means for the respective channel, responsive to a control oscillator; a control oscillator operably connected with said frequency establishing means, said control oscillator having controllable tuning means for varying the frequency of operation of both channels; switch means alternately rendering one or the other of said trasmission and reception channels operative; a voltage sensitive capacitor connected in said tuned circuit; and a bias source for said capacitor having a first tap connected with said capacitor in the "transmit" position and a second tap connected with the capacitor in the "receive" position, said second tap being adjustable to permit control of the "receive" frequency independently of the transmission frequency.

4. The transceiver of claim 3 wherein said tuned circuit includes a further main tuning control for simultaneously varying the transmission and reception frequencies of the transceiver, and said first tap to said bias source is adjustable for calibration of the transceiver.

5. The transceiver of claim 3 wherein said voltage sensitive capacitor is selectively connectible with each of said bias source taps in the "receive" position to provide both slave and independent receiver operation.

References Cited in the file of this patent

UNITED STATES PATENTS

| | | |
|---|---|---|
| 2,433,290 | Mitchell et al. | Dec. 23, 1947 |
| 2,643,329 | Silver | June 23, 1953 |